US008026408B2

(12) United States Patent
Glaug

(10) Patent No.: US 8,026,408 B2
(45) Date of Patent: Sep. 27, 2011

(54) SURFACE CLEANING PAD HAVING ZONED ABSORBENCY AND METHOD OF MAKING SAME

(75) Inventor: Frank S. Glaug, Chester Springs, PA (US)

(73) Assignee: First Quality Retail Services, LLC, Great Neck, NY (US)

( * ) Notice: Subject to any disclaimer, the term of this patent is extended or adjusted under 35 U.S.C. 154(b) by 851 days.

(21) Appl. No.: 11/545,295

(22) Filed: Oct. 10, 2006

(65) Prior Publication Data

US 2007/0074802 A1 Apr. 5, 2007

Related U.S. Application Data

(62) Division of application No. 11/240,726, filed on Sep. 30, 2005.

(51) Int. Cl.
*A61F 13/15* (2006.01)
*A61F 13/20* (2006.01)

(52) U.S. Cl. ........................................ 604/368; 604/367

(58) Field of Classification Search .................. 604/367, 604/387, 385.01, 368; 428/152, 171, 172, 428/327

See application file for complete search history.

(56) References Cited

U.S. PATENT DOCUMENTS 869,842 A 10/1907 Hill
916,755 A 3/1909 Moseke
1,002,268 A 9/1911 Hayden
1,205,979 A 11/1916 Dohm
1,742,318 A 1/1930 Newton et al.
2,136,827 A 11/1938 Schur
2,301,505 A 11/1942 Bates
2,478,148 A 8/1949 Wilson et al.
2,581,069 A 1/1952 Bertolet, Jr.
2,733,468 A 2/1956 Haber
2,739,334 A 3/1956 Hardey
2,755,498 A 7/1956 Park
2,764,774 A 10/1956 Belsky et al.
2,777,148 A 1/1957 Belsky et al.
2,816,313 A 12/1957 Beck et al.
2,853,730 A 9/1958 Belsky et al.
2,916,759 A 12/1959 Smith
2,958,146 A 11/1960 Van Dusen, Jr. et al.
3,012,264 A 12/1961 Nash
3,015,834 A 1/1962 Marrinson et al.
3,025,202 A 3/1962 Morgan et al.
3,077,627 A 2/1963 Ashworth
3,099,855 A 8/1963 Nash
3,196,475 A 7/1965 Brown (Continued)

*Primary Examiner* — Melanie Hand
(74) *Attorney, Agent, or Firm* — Amster, Rothstein & Ebenstein LLP

(57) ABSTRACT

A method of forming a surface cleaning pad body comprising a matrix web of binder fibers and superabsorbent polymer particles is provided. The method comprises the steps of depositing a mass of binder fibers onto a conveyor, shielding all but a selected area of the mass of binder fibers, depositing superabsorbent polymer particles onto the selected area of the mass of binder fibers so as to disburse superabsorbent polymer particles throughout a thickness of the mass of binder fibers, and bonding the mass of binder fibers to form a web structure and to substantially contain the superabsorbent polymer particles, thereby providing a cleaning pad body with superabsorbent polymer particles substantially contained in a zone of the mass of binder fibers that occupies at least a portion of the thickness of the mass of binder fibers and the selected area. The method further comprises the step of applying an attachment device to the cleaning pad body, thereby configuring the pad body for attachment to a cleaning implement.

7 Claims, 5 Drawing Sheets

U.S. PATENT DOCUMENTS

| | | | |
|---|---|---|---|
| 3,199,136 | A | 8/1965 | George |
| 3,221,356 | A | 12/1965 | Schirmer |
| D205,500 | S | 8/1966 | Deitel et al. |
| 3,271,231 | A | 9/1966 | Moggio et al. |
| 3,362,037 | A | 1/1968 | Griffin |
| 3,395,415 | A | 8/1968 | Leland |
| 3,395,416 | A | 8/1968 | Hughes |
| 3,395,418 | A | 8/1968 | Malmo |
| 3,412,418 | A | 11/1968 | Griffin |
| 3,425,085 | A | 2/1969 | Moss |
| 3,449,784 | A | 6/1969 | Moss |
| 3,473,184 | A | 10/1969 | Buck, Jr. |
| 3,501,813 | A | 3/1970 | Lee et al. |
| 3,528,076 | A | 9/1970 | Anderson |
| 3,528,120 | A | 9/1970 | Lindstrom |
| 3,545,876 | A | 12/1970 | Leland |
| 3,581,706 | A | 6/1971 | Rasmussen et al. |
| 3,593,359 | A | 7/1971 | Strauss et al. |
| 3,680,170 | A | 8/1972 | Sims |
| 3,692,622 | A | 9/1972 | Dunning |
| 3,698,030 | A | 10/1972 | Lockett |
| 3,711,886 | A | 1/1973 | Strauss |
| 3,713,744 | A | 1/1973 | Sims |
| 3,717,905 | A | 2/1973 | Furbeck |
| 3,720,976 | A | 3/1973 | Bailey |
| 3,733,234 | A | 5/1973 | Dunning |
| 3,737,938 | A | 6/1973 | Saltzstein |
| 3,760,450 | A | 9/1973 | Griffin et al. |
| 3,761,991 | A | 10/1973 | Moss |
| 3,764,451 | A | 10/1973 | Dunning |
| 3,776,807 | A | 12/1973 | Dunning et al. |
| 3,792,505 | A | 2/1974 | Saltzstein |
| 3,825,381 | A | 7/1974 | Dunning et al. |
| 3,827,100 | A | 8/1974 | Griffin et al. |
| 3,836,346 | A | 9/1974 | Stalego |
| 3,860,002 | A | 1/1975 | Kolbach |
| 3,877,103 | A | 4/1975 | Nash |
| 3,896,518 | A | 7/1975 | Von Post et al. |
| 3,945,736 | A | 3/1976 | Rittenbaum et al. |
| 3,964,213 | A | 6/1976 | Tobey |
| 3,965,519 | A | 6/1976 | Hermann |
| 3,966,519 | A | 6/1976 | Mitchell et al. |
| 3,973,291 | A | 8/1976 | Kolbach |
| 3,976,734 | A | 8/1976 | Dunning et al. |
| 3,978,541 | A | 9/1976 | Gustafsson |
| 3,991,431 | A | 11/1976 | Thielen |
| 3,991,432 | A | 11/1976 | Griffin et al. |
| 3,996,639 | A | 12/1976 | Griffin et al. |
| 4,007,510 | A | 2/1977 | Scoggin, Jr. et al. |
| 4,016,628 | A | 4/1977 | Kolbach |
| 4,027,672 | A | 6/1977 | Karami |
| 4,032,239 | A | 6/1977 | Maupin |
| 4,070,726 | A | 1/1978 | Joffre |
| 4,071,983 | A | 2/1978 | Thielen |
| 4,074,959 | A | 2/1978 | Curry et al. |
| 4,087,506 | A | 5/1978 | Cook et al. |
| 4,095,007 | A | 6/1978 | Marshall |
| 4,099,288 | A | 7/1978 | Rittenbaum et al. |
| 4,106,153 | A | 8/1978 | Lemelson |
| 4,114,223 | A | 9/1978 | Buchanan |
| 4,114,224 | A | 9/1978 | Disko |
| RE29,789 | E | 10/1978 | Kolbach |
| 4,141,772 | A | 2/1979 | Buell |
| 4,153,664 | A | 5/1979 | Sabee |
| 4,184,224 | A | 1/1980 | Joffre |
| 4,193,751 | A | 3/1980 | Miller |
| 4,212,302 | A | 7/1980 | Karami |
| 4,213,459 | A | 7/1980 | Sigl et al. |
| 4,217,078 | A | 8/1980 | Buell |
| 4,219,899 | A | 9/1980 | Zurawin et al. |
| 4,223,063 | A | 9/1980 | Sabee |
| 4,225,998 | A | 10/1980 | Thielen |
| 4,252,761 | A | 2/1981 | Schoggen et al. |
| 4,264,289 | A | 4/1981 | Day |
| 4,268,340 | A | 5/1981 | Fitzgerald et al. |
| 4,351,793 | A | 9/1982 | Day |
| 4,375,447 | A | 3/1983 | Chung |
| 4,375,448 | A | 3/1983 | Appel et al. |
| 4,377,230 | A | 3/1983 | Bürkner |
| 4,388,056 | A | 6/1983 | Lee et al. |
| 4,429,001 | A | 1/1984 | Kolpin et al. |
| 4,435,234 | A | 3/1984 | Hunt |
| 4,516,360 | A | 5/1985 | Gringer et al. |
| 4,516,361 | A | 5/1985 | Gringer |
| 4,551,191 | A | 11/1985 | Kock et al. |
| 4,562,610 | A | 1/1986 | Davis et al. |
| 4,564,969 | A | 1/1986 | Heinonen |
| 4,575,891 | A | 3/1986 | Valente |
| 4,583,486 | A | 4/1986 | Miller |
| 4,585,448 | A | 4/1986 | Enloe |
| 4,592,708 | A | 6/1986 | Feist et al. |
| 4,598,441 | A | 7/1986 | Stemmler |
| 4,600,458 | A | 7/1986 | Kramer et al. |
| 4,601,938 | A | 7/1986 | Deacon et al. |
| 4,603,069 | A | 7/1986 | Haq et al. |
| 4,610,678 | A | 9/1986 | Weisman et al. |
| D287,173 | S | 12/1986 | Libman |
| 4,640,810 | A | 2/1987 | Laursen et al. |
| 4,650,480 | A | 3/1987 | Stemmler |
| 4,678,527 | A | 7/1987 | Ulman |
| 4,685,167 | A | 8/1987 | Murray |
| 4,685,915 | A | 8/1987 | Hasse et al. |
| 4,698,871 | A | 10/1987 | Patkos |
| 4,712,268 | A | 12/1987 | Heinonen |
| 4,732,797 | A | 3/1988 | Johnson et al. |
| 4,750,233 | A | 6/1988 | Swain |
| 4,761,258 | A | 8/1988 | Enloe |
| 4,764,325 | A | 8/1988 | Angstadt |
| 4,765,780 | A | 8/1988 | Angstadt |
| 4,769,267 | A | 9/1988 | Hoyt |
| 4,769,283 | A | 9/1988 | Sipinen et al. |
| 4,784,892 | A | 11/1988 | Storey et al. |
| 4,793,019 | A | 12/1988 | Stima et al. |
| 4,797,310 | A | 1/1989 | Barby et al. |
| 4,808,474 | A | 2/1989 | Sipinen |
| 4,811,449 | A | 3/1989 | Kobayashi |
| 4,812,283 | A | 3/1989 | Farley et al. |
| 4,813,944 | A | 3/1989 | Haney et al. |
| 4,820,579 | A | 4/1989 | Aszman |
| 4,823,427 | A | 4/1989 | Gibbs et al. |
| 4,834,735 | A | 5/1989 | Alemany et al. |
| 4,843,674 | A | 7/1989 | Jones |
| 4,852,201 | A | 8/1989 | Wundrock et al. |
| 4,852,210 | A | 8/1989 | Krajicek |
| 4,859,388 | A | 8/1989 | Peterson et al. |
| 4,902,544 | A | 2/1990 | Kim et al. |
| 4,902,559 | A | 2/1990 | Eschwey et al. |
| 4,904,440 | A | 2/1990 | Angstadt |
| 4,908,175 | A | 3/1990 | Angstadt |
| 4,927,346 | A | 5/1990 | Kaiser et al. |
| 4,927,582 | A | 5/1990 | Bryson |
| 4,935,158 | A | 6/1990 | Aszman et al. |
| 4,945,599 | A | 8/1990 | Flynn |
| D310,589 | S | 9/1990 | Paciullo et al. |
| D310,901 | S | 9/1990 | Paciullo et al. |
| D310,902 | S | 9/1990 | Paciullo et al. |
| D311,318 | S | 10/1990 | Ovens |
| 4,961,242 | A | 10/1990 | Kresse et al. |
| 4,962,563 | A | 10/1990 | Bachar |
| 4,971,471 | A | 11/1990 | Sloan |
| 4,987,632 | A | 1/1991 | Rowe et al. |
| 4,991,250 | A | 2/1991 | Young |
| 4,995,133 | A | 2/1991 | Newell |
| 5,004,579 | A | 4/1991 | Wislinski et al. |
| 5,012,544 | A | 5/1991 | Verry |
| 5,017,324 | A | 5/1991 | Kaiser et al. |
| 5,028,224 | A | 7/1991 | Pieper et al. |
| 5,028,646 | A | 7/1991 | Miller et al. |
| 5,029,357 | A | 7/1991 | Gootoff et al. |
| 5,042,105 | A | 8/1991 | Buck et al. |
| 5,044,040 | A | 9/1991 | Tetrault |
| 5,047,023 | A | 9/1991 | Berg |
| 5,064,484 | A | 11/1991 | Craig et al. |
| 5,066,527 | A | 11/1991 | Newell |
| 5,068,079 | A | 11/1991 | Gustafsson |
| 5,071,489 | A | 12/1991 | Silvenis et al. |
| 5,087,506 | A | 2/1992 | Palumbo |

5,090,832 A 2/1992 Rivera et al.
5,092,699 A 3/1992 Silvenis
5,094,559 A 3/1992 Rivera et al.
5,102,585 A 4/1992 Pieper et al.
5,115,535 A 5/1992 Casademunt Ferre et al.
5,128,082 A 7/1992 Makoui
5,138,738 A 8/1992 Nicholson
5,143,680 A 9/1992 Molnar et al.
5,143,779 A 9/1992 Newkirk et al.
5,156,902 A * 10/1992 Pieper et al. .................. 428/206
5,160,331 A 11/1992 Forester et al.
5,165,138 A 11/1992 Garabedian
5,169,706 A * 12/1992 Collier et al. ................ 428/152
5,176,668 A 1/1993 Bernardin
5,177,831 A 1/1993 Wirth
5,178,931 A 1/1993 Perkins et al.
5,205,012 A 4/1993 Coley
5,211,903 A 5/1993 Reifenhauser
5,213,817 A 5/1993 Pelley
5,217,787 A 6/1993 Monahan
5,226,991 A 7/1993 Svaighert
5,227,107 A 7/1993 Dickenson et al.
5,230,119 A 7/1993 Woods et al.
5,230,843 A 7/1993 Howard et al.
D338,705 S 8/1993 Spokoiny
5,248,524 A 9/1993 Soderlund
5,262,223 A 11/1993 Palumbo et al.
5,269,049 A 12/1993 Gustafsson et al.
5,279,854 A 1/1994 Kendall et al.
5,280,664 A 1/1994 Lin
5,288,220 A 2/1994 Kugler et al.
5,292,239 A 3/1994 Zeldin et al.
5,292,582 A 3/1994 Gibbs et al.
5,294,478 A 3/1994 Wanek et al.
5,304,160 A 4/1994 Igaue et al.
5,306,453 A 4/1994 Shulman
5,308,896 A 5/1994 Hansen et al.
5,330,456 A 7/1994 Robinson
5,331,711 A 7/1994 Kelly
5,333,347 A 8/1994 Stranders
5,343,587 A 9/1994 Findley
5,348,547 A 9/1994 Payne et al.
5,350,370 A * 9/1994 Jackson et al. ................ 604/367
5,356,403 A 10/1994 Faulks et al.
5,372,865 A 12/1994 Arakawa et al.
5,378,528 A 1/1995 Makoui
5,395,675 A 3/1995 Altholz et al.
5,397,413 A 3/1995 Trimble et al.
5,410,771 A 5/1995 Bereza
5,410,772 A 5/1995 Lewis
5,415,650 A 5/1995 Sigl
5,415,717 A 5/1995 Perneborn
5,419,015 A 5/1995 Garcia
5,422,169 A 6/1995 Roe
5,425,725 A 6/1995 Tanzer et al.
5,426,809 A 6/1995 Muta
5,429,788 A 7/1995 Ribble et al.
5,439,364 A 8/1995 Gerking et al.
5,442,830 A 8/1995 Ohm
5,445,777 A 8/1995 Noel et al.
5,447,677 A 9/1995 Griffoul et al.
5,451,442 A 9/1995 Pieniak et al.
5,452,491 A 9/1995 Thompson
5,454,659 A 10/1995 Vosbikian et al.
5,461,749 A 10/1995 Ahlberg et al.
5,462,537 A 10/1995 Carr et al.
5,470,653 A 11/1995 Honeycutt et al.
5,471,697 A 12/1995 Daconta
5,471,703 A 12/1995 Niven
5,477,582 A 12/1995 Yamashita
5,483,720 A 1/1996 Decoopman et al.
5,490,905 A 2/1996 Huovila et al.
5,494,622 A 2/1996 Heath et al.
5,505,718 A 4/1996 Roe et al.
5,507,065 A 4/1996 McBride et al.
5,514,122 A 5/1996 Morris et al.
5,514,324 A 5/1996 Bachar
5,525,397 A 6/1996 Shizuno et al.
5,540,332 A 7/1996 Kopacz et al.
5,553,344 A 9/1996 Rosenkrantz
5,558,713 A 9/1996 Siegfried et al.
5,562,645 A 10/1996 Tanzer et al.
5,567,472 A 10/1996 Siegfried et al.
5,569,230 A 10/1996 Fisher et al.
5,571,537 A 11/1996 Geus et al.
5,575,785 A 11/1996 Gryskiewicz et al.
5,592,713 A 1/1997 Rones
5,596,787 A 1/1997 Stevens et al.
5,609,255 A 3/1997 Nichols
5,613,263 A 3/1997 Nolte
5,614,147 A 3/1997 Pelley
5,620,432 A 4/1997 Goulait et al.
5,638,569 A 6/1997 Newell
5,672,404 A 9/1997 Callahan, Jr. et al.
5,678,278 A 10/1997 McBride et al.
5,681,305 A 10/1997 Korpman
5,707,731 A 1/1998 Honeycutt et al.
D391,710 S 3/1998 Hanaoka
D391,711 S 3/1998 Hanaoka et al.
5,740,578 A 4/1998 Moore
5,750,066 A 5/1998 Vonderhaar et al.
5,771,524 A 6/1998 Wood et al.
5,804,512 A 9/1998 Lickfield et al.
5,810,800 A 9/1998 Hunter et al.
5,815,878 A 10/1998 Murakami et al.
5,836,039 A 11/1998 Rimer
5,839,147 A 11/1998 Chia-Yi et al.
5,845,361 A 12/1998 Murakami et al.
5,863,565 A 1/1999 Rossillon et al.
5,885,516 A 3/1999 Christensen
5,888,006 A 3/1999 Ping et al.
D409,343 S 5/1999 Kingry et al.
5,904,674 A 5/1999 Bonjour
5,915,437 A 6/1999 Petner
5,916,507 A 6/1999 Dabi et al.
5,916,670 A 6/1999 Tan et al.
5,922,140 A 7/1999 Wills
5,926,896 A 7/1999 Allemann et al.
D413,417 S 8/1999 Reede
5,937,471 A 8/1999 Liao
5,944,706 A 8/1999 Palumbo et al.
5,953,784 A 9/1999 Suzuki et al.
5,960,508 A 10/1999 Holt et al.
5,972,265 A 10/1999 Marra et al.
D417,050 S 11/1999 Reede
5,988,920 A 11/1999 Kunkler et al.
5,989,478 A 11/1999 Ouellette et al.
5,997,989 A 12/1999 Gessner et al.
6,003,191 A 12/1999 Sherry et al.
6,004,308 A 12/1999 Haddock
6,006,761 A 12/1999 Meledandri
D420,561 S 2/2000 Kunkler
6,020,536 A 2/2000 Osterdahl et al.
6,022,818 A 2/2000 Welchel et al.
RE36,601 E 3/2000 Woods et al.
D423,742 S 4/2000 Kingry et al.
6,045,622 A 4/2000 Holt et al.
6,047,435 A 4/2000 Suzuki et al.
6,048,123 A 4/2000 Holt et al.
6,048,489 A 4/2000 Reiter et al.
D426,039 S 5/2000 Tintelnot et al.
6,098,239 A 8/2000 Vosbikian
6,098,249 A 8/2000 Toney et al.
6,101,661 A 8/2000 Policicchio et al.
6,119,298 A 9/2000 Kenmochi
6,127,594 A 10/2000 Rosseland
6,141,820 A 11/2000 Schmiedhoff et al.
6,142,750 A 11/2000 Benecke
6,143,393 A 11/2000 Abe et al.
6,159,596 A 12/2000 Calhoun et al.
6,170,114 B1 1/2001 Woodnorth et al.
6,172,276 B1 1/2001 Hetzler et al.
6,202,250 B1 3/2001 Kenmochi et al.
6,202,259 B1 3/2001 Burr et al.
6,207,602 B1 3/2001 Gessner et al.
6,218,593 B1 4/2001 Torimae et al.
6,220,999 B1 4/2001 Kugler et al.
6,243,909 B1 6/2001 Graham et al.

6,245,413 B1 6/2001 Kenmochi et al.
D445,227 S 7/2001 Tintelnot
6,293,934 B1 9/2001 Kumasaka
6,298,517 B1 10/2001 McKay
6,305,046 B1 10/2001 Kingry et al.
6,317,917 B1 11/2001 Hsu
6,319,593 B1 11/2001 Kenmochi et al.
6,330,735 B1 12/2001 Hahn et al.
6,331,345 B1 12/2001 Kauschke et al.
6,332,234 B1 12/2001 Graham et al.
6,332,996 B1 12/2001 Dit Picard et al.
6,368,609 B1 4/2002 Fontenot et al.
6,380,151 B1 4/2002 Masters et al.
6,389,637 B1 5/2002 Hurell
6,405,403 B1 6/2002 McKay
D461,028 S 7/2002 Ng
D461,029 S 7/2002 Ng
6,416,697 B1 7/2002 Venturino et al.
6,423,048 B1 7/2002 Suzuki et al.
D462,150 S 8/2002 Rader et al.
6,437,214 B1 8/2002 Everett et al.
6,443,936 B1 9/2002 Hamilton et al.
6,454,690 B2 9/2002 Kugler et al.
D464,181 S 10/2002 Ng
6,458,299 B1 10/2002 Wierer et al.
6,458,442 B1 10/2002 McKay
6,461,086 B1 10/2002 Milanowski et al.
6,465,378 B2 10/2002 Gessner et al.
D465,890 S 11/2002 Rivera et al.
6,479,061 B2 11/2002 Fontenot et al.
6,484,346 B2 11/2002 Kingry et al.
6,485,667 B1 11/2002 Tan
6,503,238 B1 1/2003 Torstensson et al.
6,511,466 B1 1/2003 Nagami et al.
6,513,184 B1 2/2003 Brown et al.
6,540,424 B1 4/2003 Hall et al.
6,550,092 B1 4/2003 Brown et al.
6,554,937 B1 4/2003 Kenmochi et al.
D477,701 S 7/2003 Kunkler et al.
6,591,442 B2 7/2003 Kaminstein
6,601,261 B1 8/2003 Holt et al.
6,606,757 B2 8/2003 Vosbikian et al.
6,611,986 B1 9/2003 Seals
6,617,490 B1 9/2003 Chen et al.
6,623,576 B2 9/2003 Mitchell et al.
D481,184 S 10/2003 Clare et al.
D482,829 S 11/2003 Vosbikian et al.
6,651,290 B2 11/2003 Kingry et al.
6,652,498 B1 11/2003 Glasgow et al.
6,652,798 B1 11/2003 Edvardsson
6,656,569 B1 12/2003 Roussel et al.
6,659,670 B1 12/2003 Blouse
6,663,306 B2 12/2003 Policicchio et al.
6,664,438 B1 12/2003 Guidotti
6,669,391 B2 12/2003 Policicchio et al.
6,681,434 B2 1/2004 Smith
D486,616 S 2/2004 Hall et al.
D487,173 S 2/2004 Clare et al.
6,684,445 B1 2/2004 Rio et al.
6,687,943 B2 2/2004 Zorzo
6,692,172 B1 2/2004 Hsu
6,692,603 B1 2/2004 Lindsay et al.
6,701,567 B2 3/2004 Smith
6,705,792 B2 3/2004 Smith
6,710,099 B2 3/2004 Cinelli et al.
6,710,225 B1 3/2004 Everett et al.
6,716,206 B2 4/2004 Jackson
6,717,029 B2 4/2004 Baker
6,723,892 B1 4/2004 Daley et al.
6,737,009 B2 5/2004 Taylor et al.
6,743,318 B2 6/2004 Vaders
6,745,434 B2 6/2004 Smith et al.
6,750,165 B2 6/2004 Kakiuchi et al.
6,766,552 B1 7/2004 Policicchio et al.
D494,721 S 8/2004 Kotani
6,781,027 B2 8/2004 Fenwick et al.
6,783,722 B2 8/2004 Taylor
D497,699 S 10/2004 Chi-Hsiang et al.
6,802,833 B2 10/2004 Kudo
6,803,334 B2 10/2004 Mizutani et al.
6,807,702 B2 10/2004 Keck et al.
6,810,554 B2 11/2004 McKay
6,811,338 B1 11/2004 Manske, Jr. et al.
6,811,642 B2 11/2004 Ochi
6,813,799 B2 11/2004 Otsuji et al.
6,813,801 B2 11/2004 Tanaka et al.
6,814,519 B2 11/2004 Policicchio et al.
6,815,058 B2 11/2004 Watanabe et al.
6,818,166 B2 11/2004 Edwardson et al.
6,840,926 B2 1/2005 Nukina et al.
6,842,936 B2 1/2005 Policicchio et al.
6,844,066 B2 1/2005 Hamed
6,846,448 B2 1/2005 Rymer et al.
6,851,164 B2 2/2005 Andersen
6,854,911 B2 2/2005 Policicchio et al.
6,866,740 B2 3/2005 Vaders
6,871,372 B2 3/2005 Vosbikian et al.
6,878,238 B2 4/2005 Bakken et al.
6,888,044 B2 5/2005 Fell et al.
6,890,622 B2 5/2005 Adam et al.
6,893,522 B1 5/2005 Crainic
6,893,525 B1 5/2005 Schmidt et al.
6,910,823 B2 6/2005 Policicchio et al.
6,911,022 B2 6/2005 Steger et al.
6,911,174 B2 6/2005 Creagan
6,923,798 B2 8/2005 Heden et al.
6,939,492 B2 9/2005 Jackson et al.
6,948,873 B2 9/2005 Policicchio et al.
6,968,591 B2 11/2005 Tanaka
6,993,805 B2 2/2006 Prodoehl et al.
7,013,528 B2 3/2006 Parker et al.
7,024,721 B2 4/2006 McKay
7,028,364 B2 4/2006 Policicchio et al.
7,033,965 B2 4/2006 Takabayashi et al.
7,039,969 B2 5/2006 Zorzo
7,096,531 B2 8/2006 Policicchio
7,137,169 B2 11/2006 Murphy et al.
7,144,173 B2 12/2006 Policicchio et al.
7,163,349 B2 1/2007 Policicchio et al.
7,175,727 B2 2/2007 Melius
2002/0042962 A1 4/2002 Willman et al.
2002/0050016 A1 5/2002 Willman et al.
2002/0168216 A1 11/2002 Policicchio et al.
2002/0168910 A1 11/2002 Vuillaume et al.
2002/0174500 A1 11/2002 Micciche et al.
2002/0180092 A1 12/2002 Abba et al.
2002/0193032 A1 12/2002 Newkirk et al.
2003/0003830 A1 1/2003 Ouederni et al.
2003/0009839 A1 1/2003 Streutker et al.
2003/0024062 A1 2/2003 McKay
2003/0028988 A1 2/2003 Streutker et al.
2003/0041953 A1 3/2003 Farell et al.
2003/0044569 A1 3/2003 Kacher et al.
2003/0045197 A1 3/2003 Kakiuchi et al.
2003/0049407 A1 3/2003 Kacher et al.
2003/0070746 A1 4/2003 Woods et al.
2003/0082358 A1 5/2003 Wenstrup
2003/0106568 A1 6/2003 Keck et al.
2003/0110584 A1 6/2003 Clare et al.
2003/0114067 A1 6/2003 Matela et al.
2003/0119400 A1 6/2003 Beitz et al.
2003/0119401 A1 6/2003 Chakravarty et al.
2003/0119402 A1 6/2003 Melius et al.
2003/0120238 A1 6/2003 Gustavsson et al.
2003/0126710 A1 7/2003 Policicchio et al.
2003/0135181 A1 7/2003 Chen et al.
2003/0140441 A1 7/2003 Stafford
2003/0157856 A1 8/2003 Schroeder et al.
2003/0180083 A1 9/2003 Hall et al.
2003/0195485 A1 10/2003 Rangachari et al.
2003/0200991 A1 10/2003 Keck et al.
2003/0203162 A1 10/2003 Fenwick et al.
2003/0203691 A1 10/2003 Fenwick et al.
2003/0211802 A1 11/2003 Keck et al.
2003/0219591 A1 11/2003 Bany et al.
2003/0220039 A1 11/2003 Chen et al.
2003/0221274 A1 12/2003 Makhija et al.

2003/0224686 A1 12/2003 Andersen
2003/0227106 A1 12/2003 Fuller et al.
2003/0236510 A1 12/2003 Yasumura et al.
2004/0011382 A1 1/2004 Kingry et al.
2004/0019995 A1 2/2004 Kowalski et al.
2004/0031119 A1 2/2004 McKay
2004/0038008 A1 2/2004 Levine et al.
2004/0043214 A1 3/2004 Topolkaraev et al.
2004/0049166 A1 3/2004 Chen et al.
2004/0054331 A1 3/2004 Hamilton et al.
2004/0064119 A1 4/2004 Guidotti et al.
2004/0074520 A1 4/2004 Truong et al.
2004/0087928 A1 5/2004 Ducker
2004/0093678 A1 5/2004 Hart et al.
2004/0102124 A1 5/2004 Suzuki
2004/0111817 A1 6/2004 Chen et al.
2004/0121686 A1 6/2004 Wong et al.
2004/0140048 A1 7/2004 Lindsay et al.
2004/0177863 A1 9/2004 McKay
2004/0177935 A1 9/2004 Hamed et al.
2004/0192136 A1 9/2004 Gusky et al.
2004/0204697 A1* 10/2004 Litvay .......................... 604/367
2004/0206372 A1 10/2004 Holt et al.
2004/0206464 A1 10/2004 Li et al.
2004/0234760 A1 11/2004 Hamed
2004/0253892 A1 12/2004 Baker et al.
2004/0253893 A1 12/2004 Castellani
2004/0253894 A1 12/2004 Fell et al.
2004/0254551 A1 12/2004 Carnes et al.
2005/0000047 A1 1/2005 Kelly et al.
2005/0004541 A1 1/2005 Roberts
2005/0039287 A1 2/2005 Moser
2005/0045296 A1 3/2005 Adam et al.
2005/0054253 A1 3/2005 Minoguchi et al.
2005/0055791 A1 3/2005 Lin
2005/0061356 A1 3/2005 Wong et al.
2005/0079361 A1 4/2005 Hamed et al.
2005/0081888 A1 4/2005 Pung et al.
2005/0085150 A1 4/2005 Hamed
2005/0092417 A1 5/2005 Billgren et al.
2005/0109442 A1 5/2005 Neubauer et al.
2005/0109449 A1 5/2005 Scott et al.
2005/0112980 A1 5/2005 Strandqvist et al.
2005/0113776 A1 5/2005 Venturino et al.
2005/0113791 A1 5/2005 Neubauer et al.
2005/0118399 A1 6/2005 Perneborn
2005/0118916 A1 6/2005 Ducker et al.
2005/0120497 A1* 6/2005 Lynde et al. ............... 15/104.94
2005/0130539 A1 6/2005 Allen et al.
2005/0132518 A1 6/2005 Chen et al.
2005/0138749 A1 6/2005 Keck et al.
2005/0155630 A1* 7/2005 Kilkenny et al. ................ 134/6
2005/0166347 A1 8/2005 Fereshtehkhou et al.
2005/0170728 A1 8/2005 Crainic

* cited by examiner

SURFACE CLEANING PAD HAVING ZONED ABSORBENCY AND METHOD OF MAKING SAME

This application is a divisional of U.S. Utility patent application Ser. No. 11/240,726, filed on Sep. 30, 2005, which is currently pending.

FIELD OF THE INVENTION

The present invention relates to an absorbent surface cleaning pad, such as a floor cleaning pad, and to a method for fabricating the surface cleaning pad in such a way as to provide zoned absorbency.

BACKGROUND OF THE INVENTION

Conventional floor mops comprise a handle rotatably connected to a mop head and a disposable absorbent cleaning sheet coupled to the mop head. One side of the disposable absorbent cleaning sheet is placed in direct contact with a surface to be cleaned and the opposing side of the cleaning sheet is coupled to the mop head. The cleaning sheet absorbs and retains fluids, and loosens and traps dirt particles on the cleaning surface.

The cleaning sheet may comprise an absorbent portion that includes superabsorbent polymer (SAP) particles. The SAP particles can escape from the absorbent portion during manufacture, shipment, and normal use conditions. This phenomenon is commonly referred to as particle shake-out. A reduction in the amount or volume of SAP particles within the cleaning sheet hinders the performance and decreases the absorbency rating of the cleaning sheet.

Attempts have been made to overcome this problem in other fields such as the field of baby diapers, adult incontinence products, sanitary napkins and the like. For example, an absorbent structure for such products is disclosed in U.S. Pat. No. 6,562,742, which illustrates a diaper absorbent body with SAP particles placed in discrete locations or zones within the structure. According to the disclosure of U.S. Pat. No. 6,562,742, which is incorporated herein by reference in its entirety, superabsorbent polymer particles are placed in at least one strata of an upper ply in longitudinal discrete lanes along the length of the core, and the lanes are separated by adjacent lanes including fibers and a binder. Such a discrete placement of SAP particles is disclosed to allow for better containment of the particles, facilitate flow of liquid in the Z-direction because of the presence of areas with little or no SAP, and allow for easier flow and wicking of the fluid along the length of the core (x-direction). The areas with little or no SAP particles may be additionally densified to improve integrity and create higher capillary tension within smaller pores.

Nevertheless, there continues to be a need for an improved absorbent cleaning pad, such as a floor cleaning pad, and an improved method for fabricating the cleaning pad in such a way as to provide zoned absorbency.

SUMMARY OF THE INVENTION

According to one aspect of the invention, a surface cleaning pad is provided having a pad body with a cleansing surface configured for contact with a surface to be cleaned and an opposed surface configured to be coupled to a cleaning implement. The cleansing surface and the opposed surface together define a thickness of the pad body. The surface cleaning pad also has superabsorbent polymer particles maintained within a zone of the pad body. The zone of the pad body occupies the thickness of the pad body and an area that is contiguous yet less than that of the cleansing surface.

According to another aspect of the invention, a method is provided for forming a surface cleaning pad body having a matrix web of binder fibers and superabsorbent polymer particles. The method includes depositing a mass of binder fibers onto a conveyor. All but a selected area of the mass of binder fibers is shielded, and superabsorbent polymer particles are deposited onto the selected area of the mass of binder fibers so as to disburse superabsorbent polymer particles throughout a thickness of the mass of binder fibers. The mass of binder fibers is formed into a web structure that substantially contains the superabsorbent polymer particles, thereby providing a cleaning pad body with superabsorbent polymer particles substantially contained in a zone of the mass of binder fibers that occupies the thickness of the mass of binder fibers and the selected area. An attachment device is applied to the cleaning pad body, thereby configuring the pad body for attachment to a cleaning implement.

According to yet another aspect of the invention, a method is provided for forming cleaning pad bodies. The method includes forming a substrate of fibers. Superabsorbent polymer particles are applied to the substrate in zones extending along the substrate separated by a gap extending along the substrate. The substrate is parted along the gap to form substrate portions each having an edge portion substantially devoid of superabsorbent polymer particles. The substrate is parted substantially perpendicular to the gap to form cleaning pad bodies.

BRIEF DESCRIPTION OF THE DRAWINGS

Exemplary embodiments of the invention will be described with reference to the drawings, of which.

DETAILED DESCRIPTION OF THE INVENTION

Figure 1:
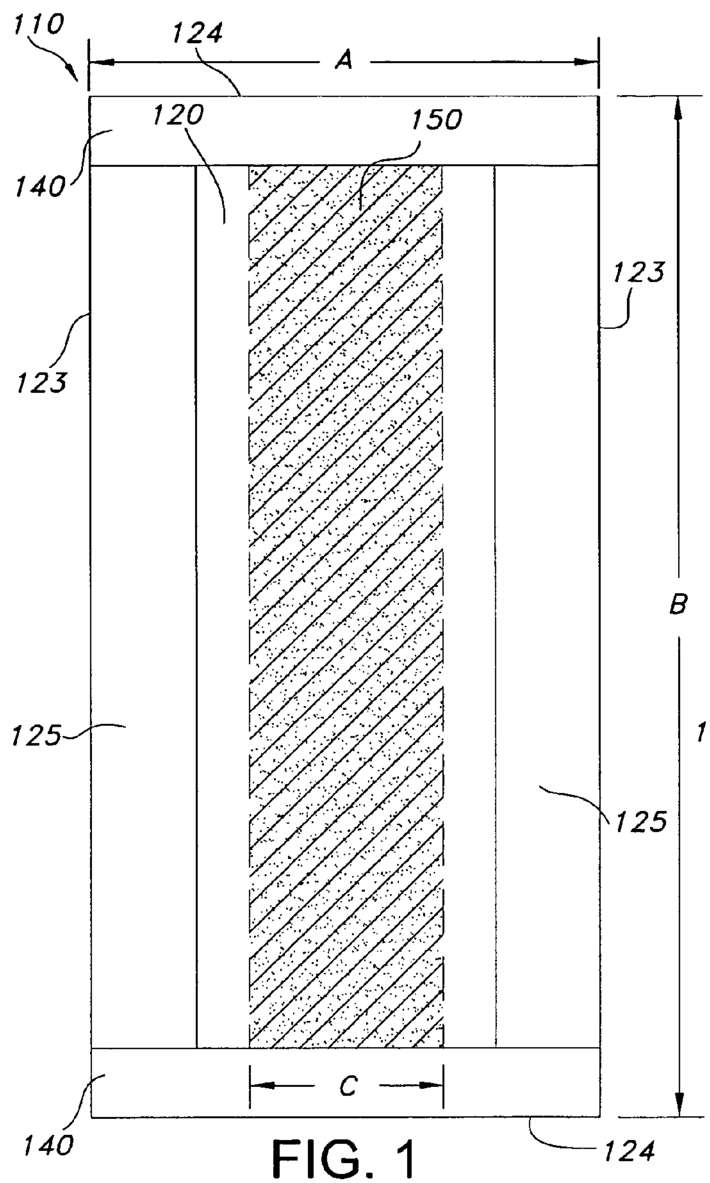
FIG. 1 is a bottom view of an absorbent cleaning pad in accordance with an exemplary embodiment of the present invention.
Figure 2:
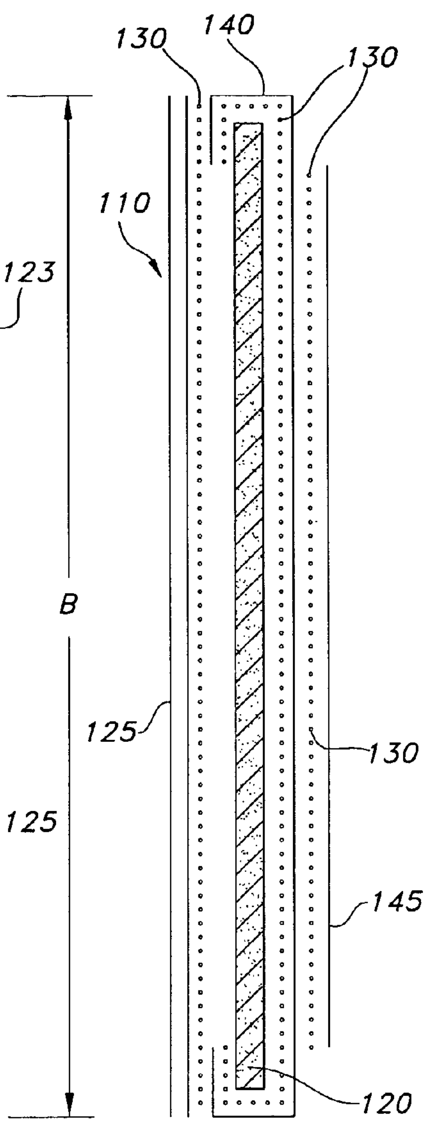
FIG. 2 is a right side view of the absorbent cleaning pad illustrated in FIG. 1.
Figure 3:
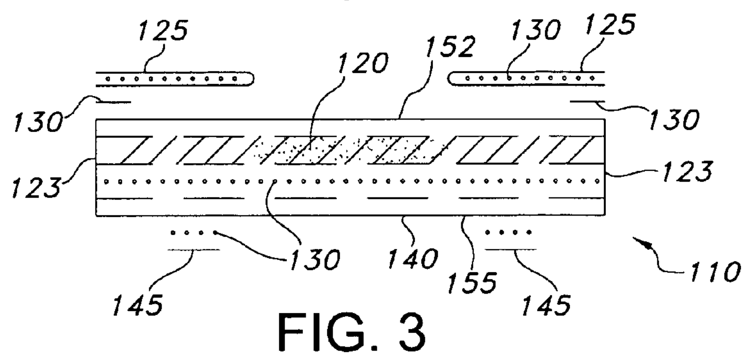
FIG. 3 is an end view of the absorbent cleaning pad illustrated in FIG. 1.

Although the invention is illustrated and described herein with reference to specific embodiments, the invention is not intended to be limited to the details shown. Rather, various modifications may be made in the details within the scope and range of equivalents of the claims and without departing from the invention. Also, the embodiments selected for illustration in the figures are not shown to scale and are not limited to the proportions shown.

As used herein, the term "superabsorbent polymer (SAP) particle" refers to any absorbent material having a g/g capacity for water of at least about 20 g/g, when measured under a confining pressure of 0.3 psi. Non-limiting examples of suitable superabsorbent materials include water insoluble, water-swellable superabsorbent gelling polymers which are described in U.S. application Ser. No. 09/831,480, the disclosure of which is incorporated herein by reference in its entirety.

Referring to the overall structure of one exemplary embodiment, FIGS. 1-4 illustrate an absorbent cleaning pad designated generally by the numeral "110". Generally, the absorbent cleaning pad 110 has a pad body formed from an airlaid composite and having a cleansing surface configured for cleansing contact with a surface to be cleaned and an opposite surface configured to be positioned facing, or attached to, a cleaning implement. The surface cleaning pad also has a barrier adhered to and substantially covering the opposite surface of the pad body and a pair of scrubbing members adhered to the cleansing surface of the pad body.

More specifically, the exemplary absorbent cleaning pad (or sheet) 110 is provided with an airlaid composite 120. Two folded dirt entrapment members 125 are adhered to a cleaning side 152 of the airlaid composite 120 by an adhesive 130 and extend along the length of the airlaid composite 120. A barrier layer 140 is adhered to an opposing attachment side 155 of the airlaid composite 120 and is folded around the width-wise sides 124 of the airlaid composite 120, thereby enclosing the width-wise sides 124 of the airlaid composite 120. Two attachment members 145 are adhered to the barrier layer 140 by an adhesive 130.

The airlaid composite 120 of the exemplary embodiment absorbs and retains fluids and/or other matter residing on a cleaning surface. The cleaning side 152 of the cleaning pad 110 is in direct contact with the floor surface, and the opposing attachment side 155 of the absorbent cleaning pad 110 is in contact with a cleaning implement such as a mop head (not shown). The dirt entrapment members 125 serve to facilitate the removal of soils from the surface being cleaned by contacting and trapping larger soil particles. The barrier layer 140 substantially prevents fluid from passing from the airlaid composite 120 to the cleaning implement, to keep the cleaning implement substantially free of fluid. The barrier layer 140 also substantially prevents absorbent particles within the airlaid composite 120 from escaping out of the exposed width-wise sides 124 of the airlaid composite 120.

The attachment members 145 provide a single attachment mechanism that can be used to temporarily couple the absorbent cleaning pad 110 to a cleaning implement such as a mop head. In this exemplary embodiment, the attachment members 145 are composed of loop fastening material available from Velcro USA Inc. of Manchester, N.H., USA. Additional benefits and features of attachment mechanisms are disclosed in U.S. application Ser. No. 11/241,138. The disclosure of U.S. application Ser. No. 11/241,138 is incorporated herein by reference in its entirety. Also, benefits and features of additional optional components, such as cuff components, are disclosed in U.S. application Ser. No. 11/240,949 and U.S. application Ser. No. 11/241,437, which are incorporated herein by reference in their entirety.

The exemplary embodiment of the absorbent cleaning pad 110 comprises a unitized airlaid composite 120 having an absorbent core composed of at least binder fibers, absorbent fibers and superabsorbent polymer (SAP) particles 150. The absorbent core should be of sufficient integrity to ensure that the absorbent core does not deform and exhibit discontinuities during its normal use in cleansing a surface. The SAP particles 150 provide the airlaid composite 120 with increased absorbency, while the binder and absorbent fibers form the overall structure of the airlaid composite 120. In this embodiment, the binder fibers are optionally bi-component fibers and the absorbent fibers are optionally cellulosic fibers.

The absorbency portion of the airlaid composite 120 may optionally be composed of pulp fibers, rayon fibers, superabsorbent fibers, a combination of superabsorbent and pulp fibers, a combination of superabsorbent and rayon fibers, a combination of pulp, superabsorbent and rayon fibers, a nonwoven web and a in-situ (liquid) superabsorbent, a tissue and in-situ (liquid) superabsorbent, a pulp and in-situ (liquid) superabsorbent, rayon fibers and a in-situ (liquid) superabsorbent, pulp, rayon fibers and a in-situ (liquid) superabsorbent, or a combination thereof of any of the above. The absorbent core component is an essentially hydrophilic material capable of absorbing and retaining fluids. The absorbent component may be composed of fibers, powders, and polymeric binders, any of which may be natural or synthetic.

The exposed sides of the airlaid composite 120 may be sealed or covered to substantially limit the SAP particles 150 from escaping out of the exposed sides of the airlaid composite 120. According to exemplary embodiments of this invention, however, to prevent the escapement of the SAP particles 150, the SAP particles may be concentrated or zoned an adequate distance away from one or more of the exposed sides of the airlaid composite 120. The matrix web of binder fibers would substantially inhibit the zoned SAP particles from migrating a significant distance toward the exposed sides of the airlaid composite 120. An example of a zoned SAP region is illustrated in FIG. 1.

Additional benefits and features of an airlaid composite construction are disclosed in U.S. application Ser. No. 11/240,929. The disclosure of U.S. application Ser. No. 11/240,929 is incorporated herein by reference in its entirety.

In addition to airlaid composites, other absorbent pad body materials, structures and/or processes are contemplated as well. For example, in another exemplary embodiment an absorbent core prepared by expanding a polymer tow, disclosed in International Publication No. WO 2004/017883, is also contemplated for use as an absorbent pad. The disclosure of International Publication No. WO 2004/017883 is incorporated herein by reference in its entirety. In this exemplary embodiment, the absorbent core comprises a plurality of filaments in the form of an expanded tow, and a layer comprising a liquid superabsorbent material on surfaces of the filaments. The liquid superabsorbent polymer may be applied to the expanded tow, for example, by spraying or by application using a gravure roller. In this embodiment, the liquid superabsorbent polymer is applied to a portion(s) of the width and/or the length of the expanded tow.

Referring now to FIGS. 1-4, specifically FIG. 1, the SAP particles 150 are dispersed in a discrete zone of the airlaid composite 120. The SAP particles 150 are substantially concentrated in the center of the width of the airlaid composite 120 to substantially limit the SAP from escaping out of the open length-wise sides 123 of the airlaid composite 120. The discrete SAP zone 150 comprises the width "C", the length "B" and the thickness of the airlaid composite 120. Although the SAP particle 150 zone is contiguous with the exposed width-wise sides 124 of the airlaid composite, the portion of the barrier layer folded over the width-wise sides 124 substantially prevents the escapement of SAP 150 out of the exposed width-wise sides 124.

Figure 4:
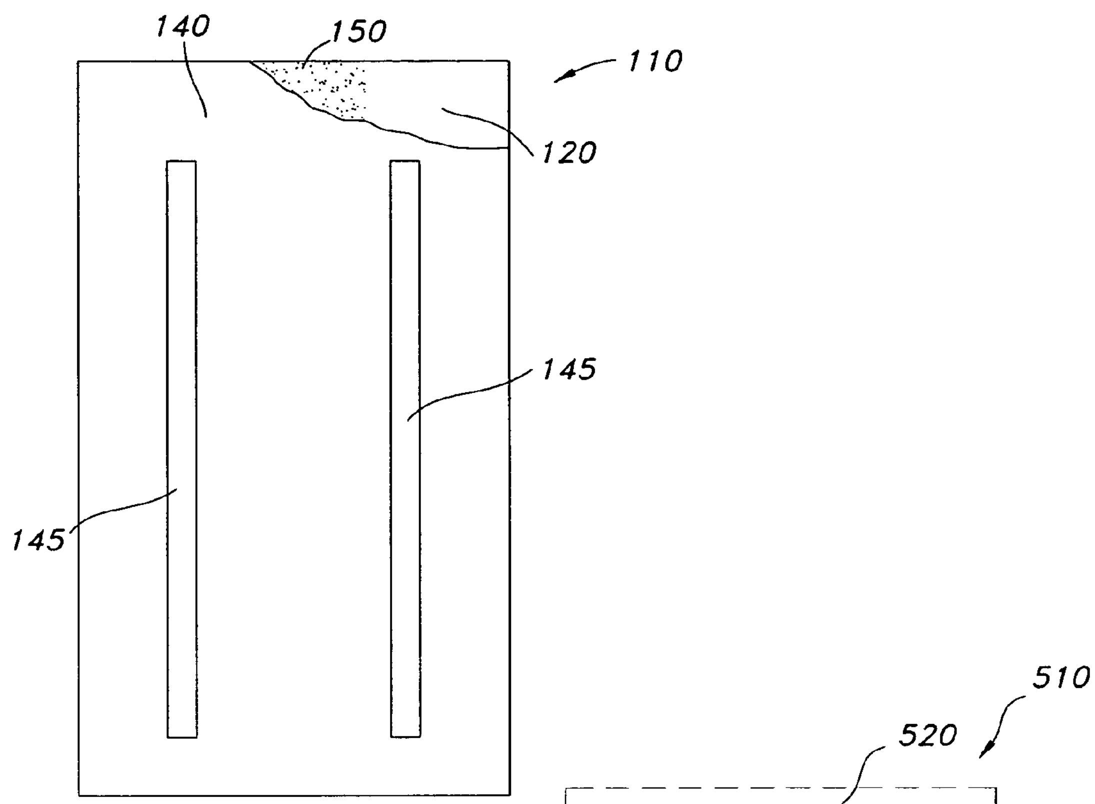
FIG. 4 is a top view of the absorbent cleaning pad illustrated in FIG. 1, including a cut-away portion of the cleaning pad.

The SAP particles 150 are also substantially prevented from escaping through the cleaning side 152 and the attachment side 155 of the airlaid composite. The dense web of binder fibers at the cleaning side 152 and the attachment side 155 of the airlaid composite substantially prevents the SAP particles 150 from escaping. In addition, the barrier layer 140 substantially prevents the SAP particles 150 from escaping out of the attachment side 155 of the airlaid composite 120, as illustrated in FIG. 4.

The exemplary embodiment provides several advantages. The zoned SAP particles reduce particle shake out, gel blocking, and manufacturing costs and promote efficient fluid absorption throughout the airlaid composite. SAP particle shake-out hinders the performance of the cleaning pad and degrades the cleaning pad's absorbency rating. By virtue of the zoned SAP, the exemplary cleaning pad 110 can retain a greater number of SAP particles within the airlaid composite.

The discrete placement of SAP particles also facilitates the flow of fluid along the regions of the cleaning pad devoid of SAP particles. The regions without SAP particles promote flow and wicking of fluid along the entire length and width of the exemplary airlaid composite. Therefore, the discrete placement of SAP particles promotes the utilization of the entire airlaid composite for absorption.

The discrete placement of SAP particles also substantially reduces gel blocking within the airlaid composite, thereby improving the cleaning pad's ability to absorb and retain fluid. Gel blocking leads to the inhibition of fluid flow throughout the entire airlaid composite, thereby reducing the absorbency rating of the cleaning pad. In other words, the airlaid composite cannot efficiently absorb fluid if too many SAP particles are positioned or concentrated on the cleaning surface of the airlaid composite, as the swelled SAP particles prevent the fluid from traveling in the z-direction (i.e., along the thickness of the airlaid composite). The discrete placement of SAP particles promotes uniform fluid absorption throughout the exemplary airlaid composite.

From the manufacturing perspective, by virtue of the SAP zone 150 illustrated in FIGS. 1-4, the barrier layer 140 does not have to be folded over the length-wise sides 123 of the airlaid composite 120, as there is no need to prevent SAP particles 150 from escaping out of the length-wise sides 123. The cleaning pad 110 therefore utilizes less barrier layer material and does not require the additional operation of folding the barrier layer over the length-wise sides 123 of the airlaid composite 120. This represents a cost savings to the manufacturer by way of reduced barrier layer material expense and labor or equipment expense.

Figure 5A:
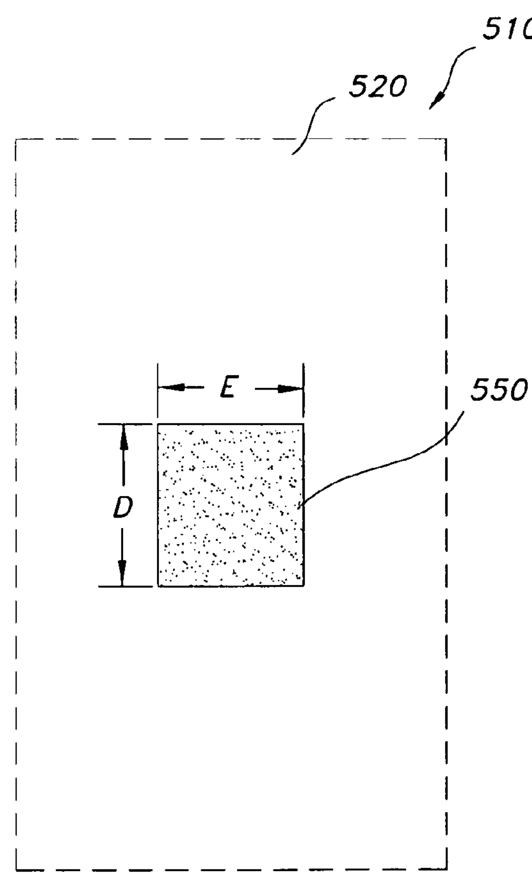
FIG. 5*a* is a bottom view of an absorbent cleaning pad in accordance with another exemplary embodiment of the present invention.

Another exemplary embodiment of a cleaning pad 510 is illustrated in is FIG. 5*a*. The SAP particle zone 550 is provided in a central region of the airlaid composite 520, remote from the entire periphery of the airlaid composite 520. The SAP particle zone 550 may adopt any form, e.g. square as shown, circular, rectangular, semicircular, etc. The outline of the airlaid composite 520 is shown in dotted line form to indicate that the airlaid composite 520 has no boundaries and that the zone 550 can be provided in any desired shape or configuration. In other words, the length and width of the airlaid composite may be any dimension larger than the length "D" and width "E" of the superabsorbent particle 550 zone. For example, the airlaid composite 520 of the exemplary embodiment may be an individual cleaning pad or a continuous cleaning sheet composed of a plurality of cleaning pads.

By virtue of the zoned SAP 550, the barrier layer (not shown) of the exemplary embodiment illustrated in FIG. 5*a* does not have to conceal or otherwise cover the exposed length-wise and width-wise sides of the airlaid composite 520 to prevent shake-out of SAP. The zoned SAP particles 550 cannot migrate to the periphery of the airlaid composite, assuming that there is an adequate gap between the SAP particle zone 550 and the periphery of the airlaid composite 520. By zoning the SAP particles away from the periphery of the airlaid composite 520, a material and assembly cost reduction may be realized, as additional barrier layer material does not have to cover the sides of the airlaid composite 520 and the barrier layer folding operations are eliminated.

Figure 5B:
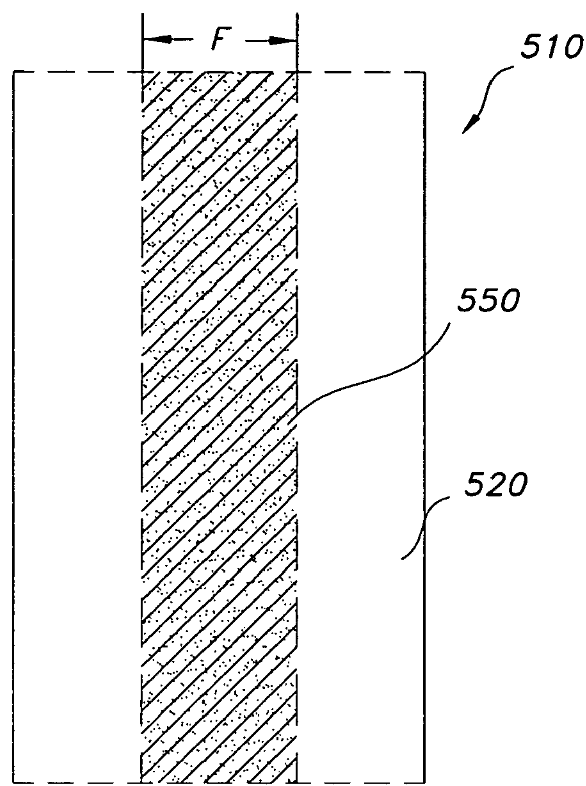
FIG. 5*b* is a bottom view of an absorbent cleaning pad in accordance with yet another exemplary embodiment of the present invention.

Another exemplary embodiment of a cleaning pad 510 is illustrated in FIG. 5*b*. Similar to the exemplary embodiment illustrated in FIG. 1, the SAP particle zone 550 extends along the entire length of the airlaid composite 520. The width-wise sides of the airlaid composite 520 are shown in dotted form to indicate that the length of the airlaid composite 520 is optionally continuous. This exemplary embodiment may optionally represent a continuous airlaid sheet that can be divided, by width-wise cutting or other parting operation, into a plurality of individual airlaid pads.

Figure 5C:
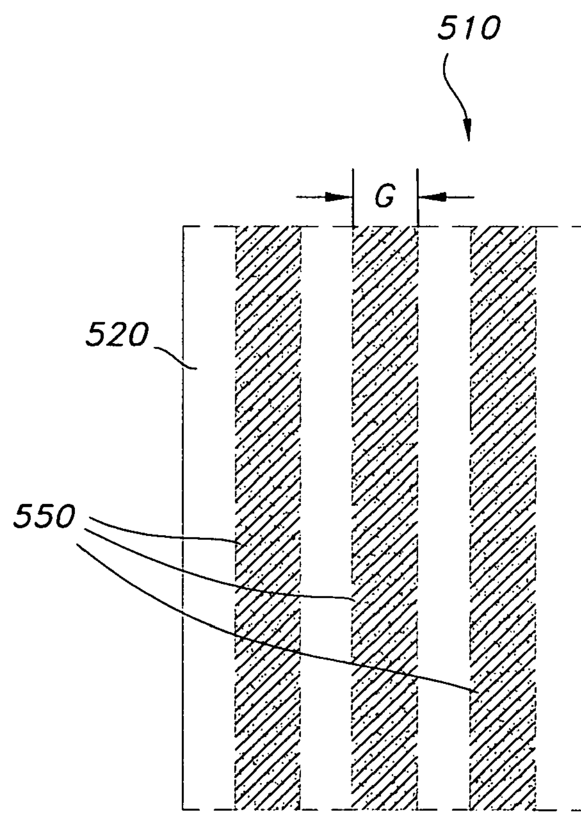
FIG. 5*c* is a bottom view of an absorbent cleaning pad in accordance with still another exemplary embodiment of the present invention.

Another exemplary embodiment of a cleaning pad 510 is illustrated in FIG. 5*c*. Similar to the exemplary embodiment illustrated in FIG. 5*b*, the SAP zone 550 extends along the entire length of the airlaid composite 520. This exemplary embodiment provides multiple zones of SAP particle 550 of width "G". However, the width of the multiple zones of SAP may vary as well, depending upon the fluid distribution and fluid management. The discrete placement of the SAP particle zones 550 facilitates the flow of fluid along the regions of the cleaning pad devoid of SAP particles. The regions without SAP particles promote flow and wicking of the fluid along the length and width of the cleaning pad and limit gel blocking.

Alternatively, the cleaning pad embodiment shown in FIG. 5*c* is provided as an interim substrate or step in forming an absorbent cleaning pad. For example, a method of forming cleaning pad bodies can include forming a substrate of fibers, and then depositing superabsorbent polymer particles to the substrate in zones extending along the substrate separated by one or more gaps extending along the substrate to form the interim cleaning pad substrate 510. The substrate 510 can then be cut or otherwise parted along one or more of the gaps to form substrate portions each having an edge portion substantially devoid of superabsorbent polymer particles. Such an interim substrate 510 can then be parted in a direction substantially perpendicular to the gaps to form cleaning pad bodies. In other words, the substrate 510 can be divided along the gaps between adjacent zones and then cut or parted in a direction substantially perpendicular to the gaps to form shorter lengths, thereby forming a structure corresponding to the absorbent composite 120 used in the absorbent cleaning pad 110 shown in FIGS. 1-4.

Figure 6:
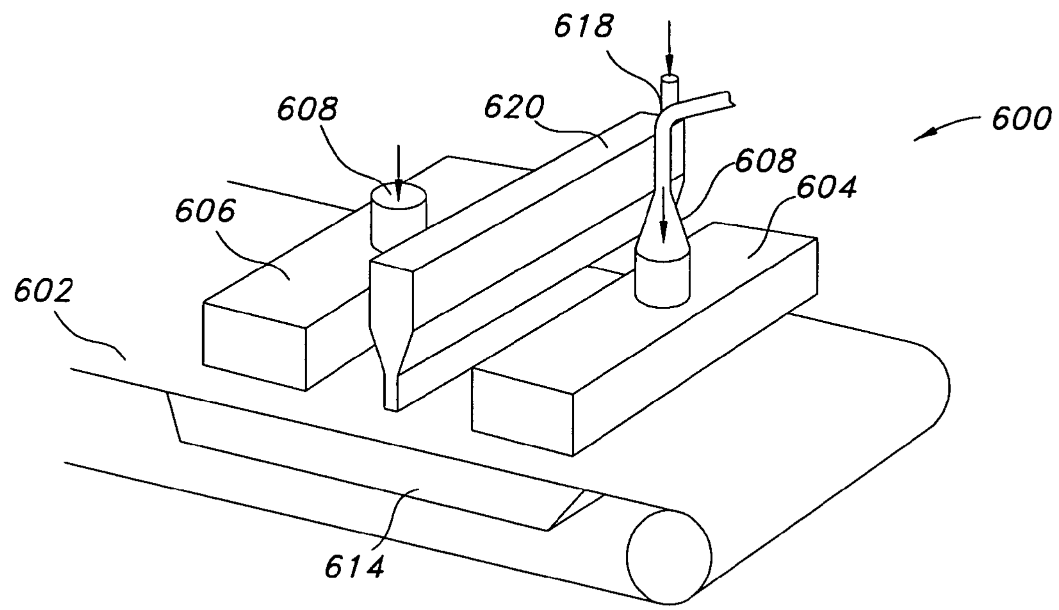
FIG. 6 is a schematic, perspective view of a system that can be used to form an absorbent cleaning pad according to an embodiment of this invention.
Figure 7:
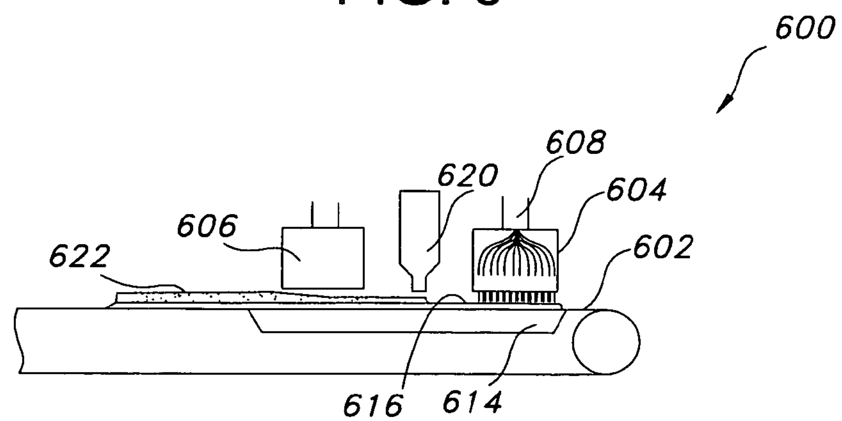
FIG. 7 is a schematic, sectional side view of the system illustrated in FIG. 6.

FIGS. 6 and 7 schematically show an example of an airlaid composite forming system 600 that can be used to form an absorbent cleaning pad according to one aspect of the invention if the pad includes an airlaid composite. It is also contemplated that the absorbent cleaning pad is formed with an alternative structure, including any fibrous or non-fibrous material capable of defining a substrate.

Although only one example of an airlaid composite forming system is illustrated, this invention is not limited to the particular airlaid composite forming system selected for illustration in the Figures, and this invention is not limited to an absorbent pad having an airlaid structure. Other airlaid forming systems and other pad-producing processes are contemplated as well.

The airlaid composite forming system 600 comprises a moving perforated forming wire 602, which acts as a conveyor, with forming head equipment mounted thereabove. In the orientation illustrated in FIGS. 6 and 7, the upper surface of the wire 602 moves from right to left at a rate appropriate for proper distribution of materials on the wire 602. Alternatively, the wire 602 can remain stationary while other equipment (e.g., forming heads) move respect to the wire 602. Nevertheless, a continuous conveyer process such as that illustrated in FIGS. 6 and 7 is advantageous.

Forming heads 604 and 606 each receives a flow of an air fluidized fiber material (e.g., binder fibers, wood pulp, other fibrous materials, or combination thereof) via supply channels 608. A suction source 614 mounted beneath the perforated moving wire 602, draws air downwardly through the perforated moving wire 602. In one embodiment, the binder fiber material is distributed and compacted (by the air flow) over the width of the wire 602 to form an light web layer on the surface of the wire 602. A second forming head (not shown) is provided to distribute a second web layer 616 composed of a mixture of binder fibers and cellulosic fibers onto the light web layer.

The SAP particles are introduced into the particle dispenser 620 through a tube 618. The particle dispenser 620 is configured to direct (e.g., spray, sprinkle, release, etc.) the SAP particles onto the perforated moving wire 602 above the web layer 616. The SAP particles are either distributed over a portion of the width and/or length of the web layer 616 or distributed over the entire web layer 616. The SAP particles blend and disseminate through the web layer 616 and are thereby maintained throughout the entire thickness of the airlaid composite.

A third forming head 606 is provided to distribute another web layer 622 of binder and/or cellulosic fibers over the SAP particles. Although only two forming heads are illustrated, more forming heads may be required to distribute additional layers of binder fiber or cellulosic fiber. Thereafter, the web layers are heated for a period of time until the binder fibers melt together to form a web-like structure, i.e., an airlaid composite.

In functional terms, the first light web layer including binder fibers is oriented toward the cleaning surface and provides structure to the airlaid composite. The second web layer 616 including binder fibers and cellulosic fibers is maintained over the first light web layer and provides structure and absorbency to the airlaid composite. The SAP particles are maintained over the second web layer 616 to provide additional absorbency to the airlaid composite. The third web layer 622 including binder fibers and cellulosic fibers are maintained over the SAP particles and is oriented toward the cleaning implement. The third web layer 622 provides structure and absorbency to the airlaid composite. The web layers collectively form an airlaid composite according to one embodiment.

Although not shown, in yet another exemplary embodiment, a preformed sheet comprising SAP particles may be positioned above the light web layer 616, as an alternative to using the particle dispenser 620. The preformed sheet may be of any size equal to or smaller than the light web layer 616.

Still referring to the airlaid composite forming system illustrated in FIGS. 6 and 7, to form the airlaid composite illustrated in FIG. 5*a*, the SAP particles are distributed above a portion of the length and the width of the web layer 616. The particle dispenser 620 is configured to distribute a volume of SAP particles to a zone of length "D" and width "E" above the web layer 616 to form a single airlaid composite. To form a continuous sheet composed of multiple airlaid composites 520, the particle dispenser 620 is configured to periodically distribute the SAP in zones onto the moving web layer 616. A processing unit (not shown) controls the operation of the particle dispenser 620 and the duration of each SAP distribution period. The duration of each SAP distribution period is dependent upon the speed of the moving wire 602, the length of each individual airlaid composite and the length of the SAP particle zone.

In still another exemplary embodiment and still referring to FIGS. 5*a*, 6, and 7, SAP particles and binder fibers are both introduced into tube 618 of the particle dispenser 620. The particle dispenser 620 therefore distributes both SAP particles and binder fibers over a zone of length "D" and width "E" over the web layer 616. However, it should be understood that the particle dispenser 620 and the forming heads 604 and 606 can distribute any type of fiber or particle or combination thereof, as the dispenser and forming heads are not limited to merely distributing binder fibers and SAP particles.

Still referring to the airlaid composite forming system illustrated in FIGS. 6 and 7, to form the cleaning pad 520 illustrated in FIG. 5*b* the SAP particles 550 are distributed above a segment "F" (as illustrated in FIG. 5*b*) of the web layer 616. The particle dispenser 620 is configured to limit the distribution of the SAP particles 550 over a segment "F" of the web layer 616. In other words, the particle dispenser 620 only sprays, sprinkles, or releases the SAP particles 550 in segment "F".

As an alternative to configuring the particle dispenser 620 to distribute the SAP particles over the segment "F" of the web layer 616, a screen may be positioned above the web layer 616 to limit the placement of the SAP particle zone 550 to a segment "F" of the web layer 616. In this exemplary embodiment, the particle dispenser 620 is configured to distribute the SAP particles over the entire web layer 616, although the screen limits the distribution of the SAP particles to the segment "F" above the web layer 616.

Figure 8:
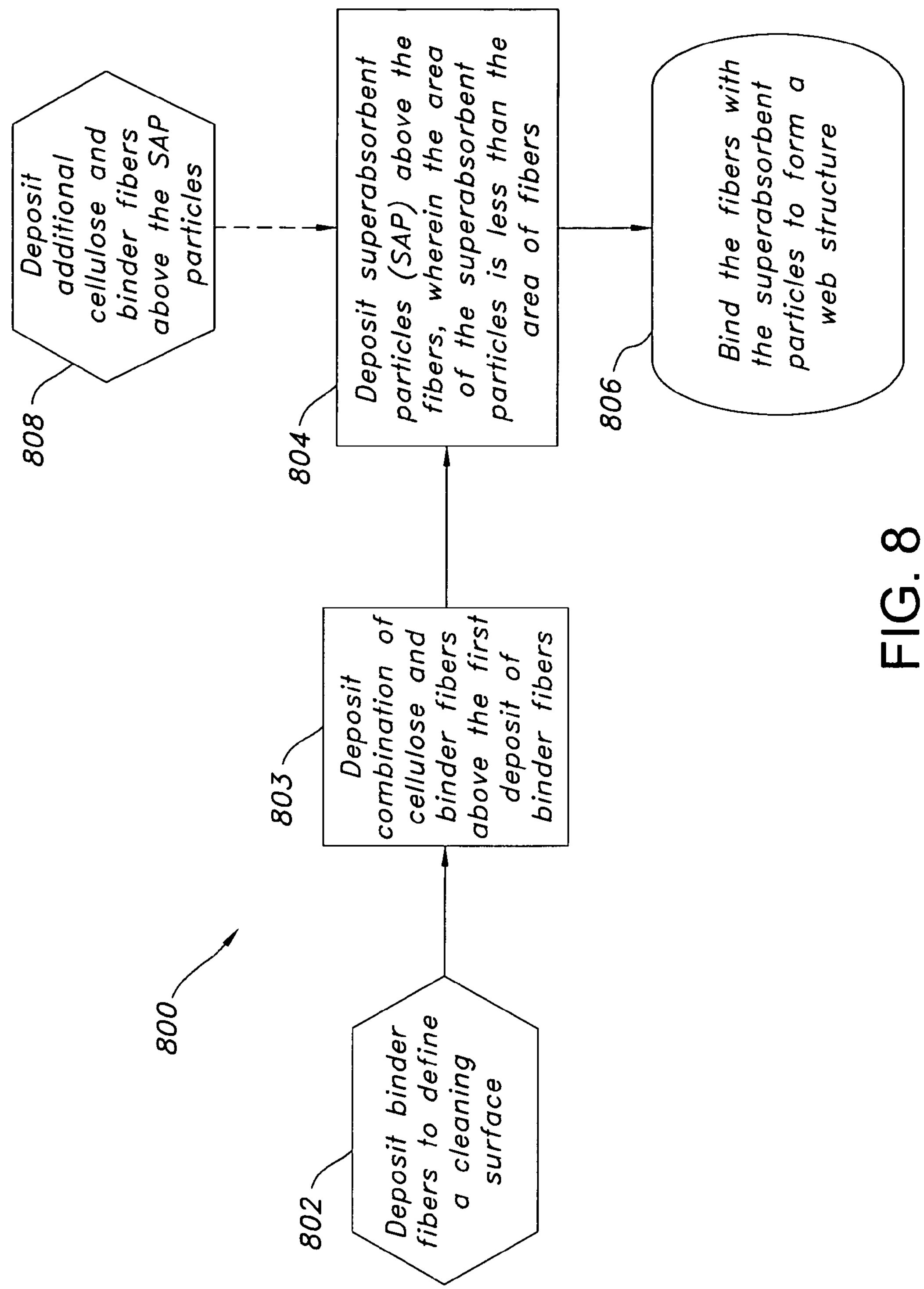
FIG. 8 is a flow chart illustrating exemplary steps of a process for forming an absorbent cleaning pad according to another exemplary embodiment of the invention.

FIG. 8 is a flow chart 800 of exemplary steps for fabricating an airlaid composite in accordance with the present invention. Block 802 illustrates the step of depositing binder fibers onto a moving perforated wire so as to define a cleaning surface of the pad body. Block 803 illustrates the step of depositing both binder and cellulosic fibers above the binder fibers. Block 804 illustrates the step of depositing superabsorbent polymer particles above the binder and cellulosic fibers, wherein an area of the superabsorbent polymer particles is less than an area of binder and cellulosic fibers. Block 808 illustrates the optional step of depositing additional binder fibers above the layer of binder and cellulosic fibers. Block 806 illustrates the final step of bonding the binder fibers with the cellulosic fibers and superabsorbent polymer particles to form a web-like airlaid structure.

While preferred embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention. Also, the embodiments selected for illustration in the figures are not shown to scale and are not limited to the proportions shown.

What is claimed:

1. A method of forming a surface cleaning pad body comprising a matrix web of binder fibers and superabsorbent polymer particles, said method comprising the steps of:

a) depositing a mass of binder fibers onto a conveyor;

b) shielding using a screen all but a selected area of the mass of binder fibers;

c) depositing superabsorbent polymer particles through the screen onto the selected area of the mass of binder fibers so as to disburse superabsorbent polymer particles throughout a thickness of the mass of binder fibers;

d) bonding the mass of binder fibers to form a web structure and to contain the superabsorbent polymer particles, thereby providing a cleaning pad body with superabsorbent polymer particles contained in a zone of the mass of binder fibers that occupies at least a portion of the thickness of the mass of binder fibers and the selected area; and e) applying an attachment device to the cleaning pad body, thereby configuring the pad body for attachment to a cleaning implement.

2. The method of claim 1, wherein said shielding step further comprises shielding a discrete area of the mass of binder fibers along the length of the mass of binder fibers.

3. The method of claim 2, wherein said shielding step further comprises shielding a discrete area of the mass of binder fibers along the width of the mass of binder fibers.

4. The method of claim 1, wherein said depositing a mass of binder fibers step further comprises depositing a mixture of binder fibers and absorbent fibers onto a conveyor.

5. The method of claim 4, wherein said depositing a mass of binder fibers step further comprises depositing a mixture of binder fibers and cellulosic fibers onto a conveyor.

6. The method of claim 4, wherein said depositing a mass of binder fibers step further comprises depositing a mixture of binder fibers and rayon fibers onto a conveyor.

7. The method of claim 1, wherein said bonding step further comprises bonding the mass of binder fibers to form a web structure and to substantially contain the superabsorbent polymer particles, thereby providing a cleaning pad body with superabsorbent polymer particles substantially contained in a zone of the mass of binder fibers that occupies the majority of the thickness of the mass of binder fibers and the selected area.

* * * * *